United States Patent
Denny

(10) Patent No.: US 12,531,222 B2
(45) Date of Patent: Jan. 20, 2026

(54) MASS SPECTROMETER CALIBRATION

(71) Applicant: Micromass UK Limited, Wilmslow (GB)

(72) Inventor: Richard Denny, Newcaste-under-Lyme (GB)

(73) Assignee: Micromass UK Limited, Wilmslow (GB)

( * ) Notice: Subject to any disclaimer, the term of this patent is extended or adjusted under 35 U.S.C. 154(b) by 955 days.

(21) Appl. No.: 17/635,318

(22) PCT Filed: Aug. 28, 2020

(86) PCT No.: PCT/GB2020/052071
§ 371 (c)(1),
(2) Date: Feb. 14, 2022

(87) PCT Pub. No.: WO2021/038244
PCT Pub. Date: Mar. 4, 2021

(65) Prior Publication Data
US 2022/0293403 A1    Sep. 15, 2022

Related U.S. Application Data

(60) Provisional application No. 62/894,298, filed on Aug. 30, 2019.

(30) Foreign Application Priority Data

Aug. 30, 2019    (GB) .................................... 1912494

(51) Int. Cl.
H01J 49/00    (2006.01)
(52) U.S. Cl.
CPC ...... H01J 49/0009 (2013.01); H01J 49/0036 (2013.01)

(58) Field of Classification Search
None
See application file for complete search history.

(56) References Cited

U.S. PATENT DOCUMENTS 9,418,824 B2    8/2016    Wildgoose
2005/0023454 A1    2/2005    Bateman et al.
(Continued)

FOREIGN PATENT DOCUMENTS

CN    102901529 A    1/2013
CN    104160472 A    11/2014
(Continued)

OTHER PUBLICATIONS

Combined Search and Examination Report under Sections 17 and 18(3) for Application No. GB1912494.0, dated Jun. 4, 2020, 8 pages.
(Continued)

*Primary Examiner* — Walter L Lindsay, Jr.
*Assistant Examiner* — Geoffrey T Evans
(74) *Attorney, Agent, or Firm* — Goodwin Procter LLP

(57) ABSTRACT

Disclosed herein is a method of processing mass spectral data comprising making direct calibration measurements to determine a calibration shift of the mass spectrometry instrument at a calibration time and determining a set of intrinsic ion species that persist across multiple acquisition periods. The direct calibration measurements are then used together with an expected variation in calibration shift as well as the set of intrinsic ion species to calculate the calibration shift of the mass spectrometry instrument at one or more time point(s) of interest other than the calibration time.

12 Claims, 8 Drawing Sheets

(56) References Cited

U.S. PATENT DOCUMENTS

| | | |
|---|---|---|
| 2008/0067346 A1 | 3/2008 | Amster et al. |
| 2013/0234014 A1 | 9/2013 | Remes |
| 2013/0238252 A1* | 9/2013 | Perenon ............ H01J 49/0018 702/23 |
| 2015/0041636 A1 | 2/2015 | Giles et al. |
| 2015/0090873 A1 | 4/2015 | Brown et al. |
| 2016/0013036 A1 | 1/2016 | Wildgoose |
| 2016/0035551 A1 | 2/2016 | Green et al. |
| 2016/0203963 A1 | 7/2016 | Green |
| 2017/0125222 A1 | 5/2017 | Brown et al. |
| 2018/0350575 A1 | 12/2018 | Hock et al. |
| 2022/0293403 A1 | 9/2022 | Denny |

FOREIGN PATENT DOCUMENTS

| | | |
|---|---|---|
| CN | 106066359 A | 11/2016 |
| CN | 107112192 A | 8/2017 |
| CN | 107667413 A | 2/2018 |
| CN | 108987238 A | 12/2018 |
| EP | 3073510 A1 | 9/2016 |
| GB | 2513463 A | 10/2014 |
| GB | 2581211 A | 8/2020 |
| GB | 2583829 A | 11/2020 |
| WO | 2014194320 A1 | 12/2014 |
| WO | 2015181562 A1 | 12/2015 |
| WO | 2016193721 A1 | 12/2016 |
| WO | 2020044050 A1 | 3/2020 |
| WO | 2021038242 A1 | 3/2021 |

OTHER PUBLICATIONS

Combined Search and Examination Report under Sections 17 and 18(3) for Application No. GB2013535.6, dated Mar. 1, 2021, 6 pages.

International Search Report and Written Opinion for International application No. PCT/GB2020/052071, mailed on Nov. 4, 2020, 15 pages.

Wolski, W, E., et al., "Calibration of mass spectrometric peptide mass fingerprint data without specific external or internal calibrants", BMC Bioinformatics 6(1):1-17 (2005).

International Search Report and Written Opinion for PCT Application No. PCT/GB2020/052069, mailed on Nov. 9, 2020.

Search and Examination Report issued in GB2013542.2, mailed on Feb. 26, 2021.

Extended Search Report for European Patent Application No. 25186304.9, mailed Aug. 11, 2025.

Valentine, S. J., et al., "Developing liquid chromatography ion mobility mass spectometry techniques", Expert Review of Proteomics, 2(4):553-565, Aug. 1, 2005.

* cited by examiner

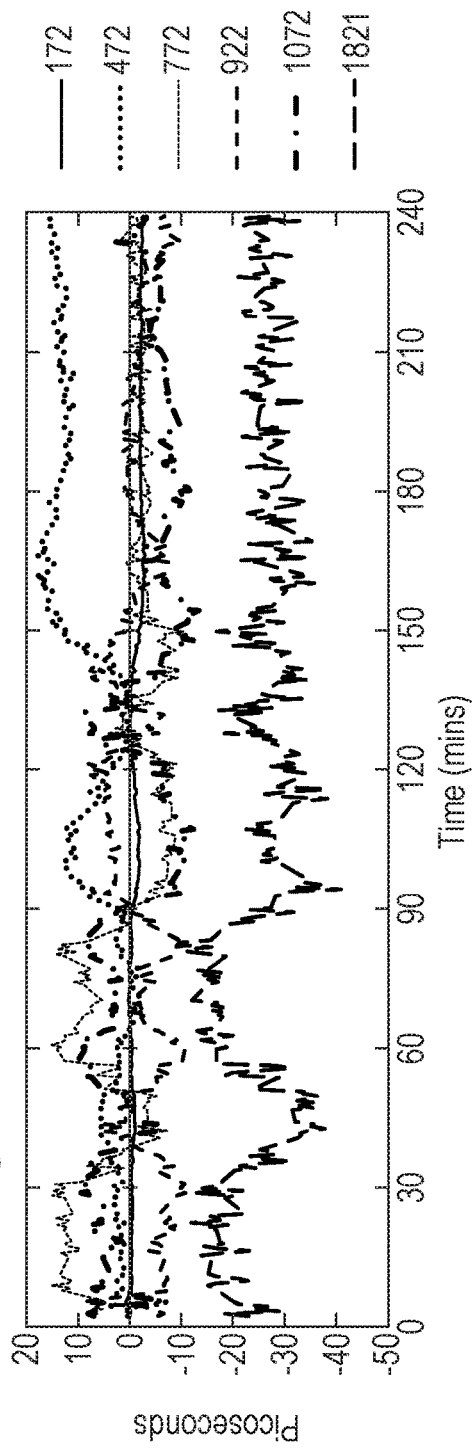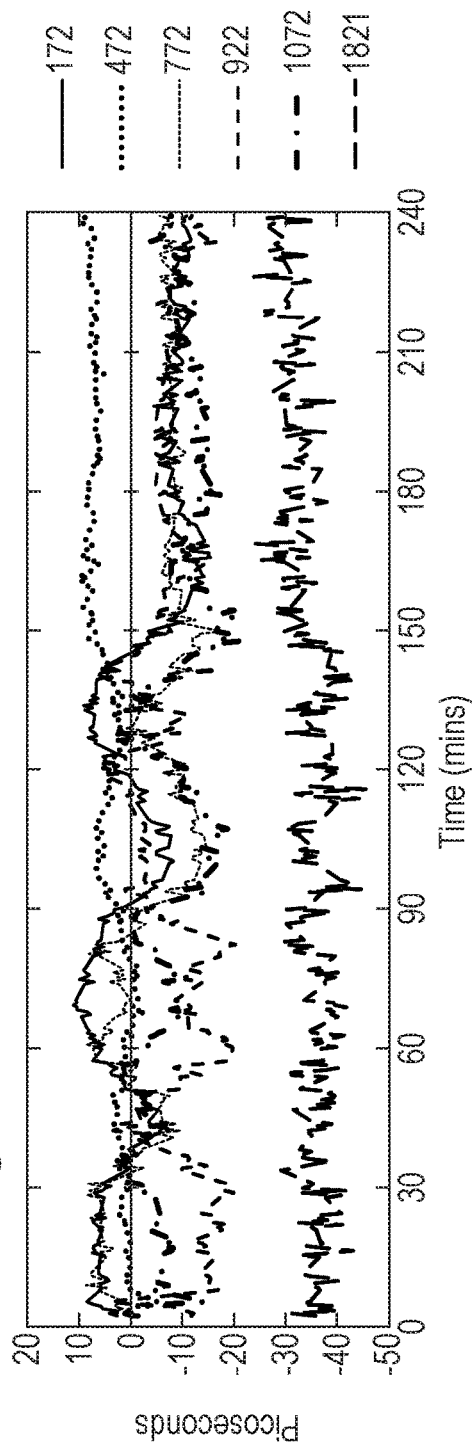

MASS SPECTROMETER CALIBRATION

CROSS-REFERENCE TO RELATED APPLICATIONS

This application is a U.S. national phase filing claiming the benefit of and priority to International Patent Application No. PCT/GB2020/052071, filed Aug. 28, 2020, which claims priority from and the benefit of United Kingdom Patent Application No. 1912494.0 filed on Aug. 30, 2019 and U.S. Provisional Patent Application No. 62/894,298 filed on Aug. 30, 2019. The entire content of these applications are incorporated herein by reference.

FIELD OF THE INVENTION

The present invention relates generally to a method of correcting mass spectral data, as well as to mass spectrometers and methods of mass spectrometry. Various embodiments are disclosed which relate to methods for correcting errors associated with variations in instrument calibration over time, for example due to fluctuations related to environmental factors such as temperature and the stability of power supplies.

BACKGROUND

It is known that the accuracy of a high resolution mass analyser or mass spectrometer is limited by its sensitivity to environmental factors such as temperature and the stability of power supplies.

The accuracy of a high resolution mass analyser or mass spectrometer may also be affected by various bulk properties of the sample being analysed. For example, space-charge effects related to a sample being analysed may affect the resolution of a high resolution mass analyser or mass spectrometer.

In order to improve the accuracy of a high resolution mass analyser or mass spectrometer it is known to periodically to calibrate the mass analyser or mass spectrometer. The process of calibrating the mass analyser or mass spectrometer may comprise generating or using one or more test signals related to one or more well-characterised analytes in order to monitor and correct for calibration shifts. The general loss of accuracy of a high resolution mass analyser or mass spectrometer may be characterised as relating to a calibration shift.

Various techniques are known to attempt to correct for such calibration shifts. The known techniques may be broadly divided into two types namely: (i) extrinsic correction methods; and (ii) intrinsic correction methods.

The calibration shift may occur over a characteristic timescale. Accordingly, the calibration corrections which should ideally be applied to acquired mass spectral data in order to correct for such calibration shifts may only be determined with sufficient accuracy at times which are sufficiently close to the times when the test signals were generated. It will be understood, therefore, that if there is too great a time interval between generating test signals then the calibration of the mass analyser or mass spectrometer may start to drift significantly between test signals.

Known extrinsic correction methods typically involve periodically running the instrument or mass spectrometer in a mode of operation wherein an external lock mass sample or calibrant is introduced into the instrument or mass spectrometer and mass spectral data corresponding to the lock mass sample or external calibrant is acquired. The mass or mass to charge ratios of analyte ions may be adjusted or corrected based upon the determined mass or mass to charge ratio of the known lock mass ions.

The lock mass sample or external calibrant may be supplied or otherwise introduced into the instrument or mass spectrometer through a separate dedicated mechanism which may be separate from a corresponding mechanism which may be used to deliver or introduce one or more analyte samples. A lock mass sample or external calibrant may be supplied or introduced into the instrument or mass spectrometer via a separate, different or dedicated ion source. For example, it is known to provide an instrument or mass spectrometer with two separate Electrospray ionisation ("ESI") ion sources. The first Electrospray ionisation ion source may be used to ionise a sample and produce analyte ions whereas the second separate Electrospray ion source may comprise a dedicated Electrospray ionisation ion source which is just used to introduce a lock mass sample or external calibrant into the instrument or mass spectrometer for mass calibration purposes.

It will be understood that the known extrinsic correction methods involve introducing a lock mass sample or external calibrant in a manner such that the analysis of the sample and hence the generation of analyte ions of interest is periodically interrupted which is generally undesirable.

Mass peaks relating to the lock mass sample or external calibrant do not appear in mass spectra which correspond with the analyte samples, which is beneficial for the purity of both the lock mass data and the analyte mass spectral data. However, the requirement to repeatedly switch the instrument or mass spectrometer between two different configurations or modes of operation can be problematic. In particular, if it is necessary for multiple corrections to be made during an experiment or acquisition then it will be necessary for the experiment to be interrupted multiple times whilst separate lock mass acquisitions take place. It will be apparent that the repeated interruption of the acquisition of analyte mass spectral data can result in a loss of analyte data which is problematic.

Furthermore, the known extrinsic correction methods require the provision of an additional dedicated ion source to introduce the lock mass substance or external calibrant into the instrument or mass spectrometer. The requirement to provide a separate dedicated lock mass ion source introduces extra complexity (both mechanical and electrical) and involves additional cost.

Known intrinsic correction methods differ from extrinsic correction methods in that according to known intrinsic correction methods the species which is effectively used as a lock mass or calibrant is already present in some or all of the analyte spectra. The intrinsic lock mass substance or calibrant may be endogenous or exogenous to the analyte sample being analysed. For example, if the intrinsic lock mass is exogenous to the analyte sample then the lock mass or calibrant may have been added to the sample prior to ionisation of the sample. If the lock mass or calibrant is endogenous to the analyte sample then the lock mass or calibrant may comprise chemical background ions or another component of the sample itself.

Known intrinsic correction methods have the advantage compared to known extrinsic correction methods in that there is no need to interrupt the acquisition of analyte data. However, if non-native (exogenous) lock mass compounds are added to a sample prior to ionisation then there is the potential for interference to occur between analyte species and the added lock mass species which may compromise the accuracy of measuring both the analyte and lock mass species. Also, if an endogenous component (such as background ions) is used to calibrate the instrument then there may be occasions where such components are suppressed.

U.S. Pat. No. 9,418,824 (Micromass) discloses a method of mass spectrometry comprising initially calibrating or recalibrating a mass spectrometer at a time $T_0$ and at the same time measuring a time of flight or mass to charge ratio $M_0$ of one or more lock mass ions. However, whilst U.S. Pat. No. 9,418,824 (Micromass) provides various improvements compared to other known correction methods, it is believed that there is still scope for further improvement in this regard.

Accordingly, it is desired to provide improved techniques for determining such calibration shifts, in particular to be able to improve the accuracy of a high resolution mass analyser or mass spectrometer by providing an improved method of calibrating the instrument and correcting mass spectral data.

SUMMARY

According to an aspect there is provided a method of processing mass spectral data, the mass spectral data comprising a plurality of mass spectra obtained from a mass spectrometry instrument during a corresponding plurality of acquisition periods, the method comprising:

making direct calibration measurements to determine a calibration shift of the mass spectrometry instrument at one or more calibration time(s) using calibrants which have known mass to charge ratio (m/z) values or previously mass measured mass to charge ratio (m/z) values;

determining a set of one or more intrinsic ion species that are present during the course of the acquisition; and using the direct calibration measurements, an expected variation in calibration shift over time and the set of one or more intrinsic ion species to calculate the calibration shift of the mass spectrometry instrument at one or more time point(s) of interest other than the calibration time(s).

In embodiments, the method comprises determining a set of one or more intrinsic ion species that are present across multiple acquisition periods by tracking mass spectral peaks across different acquisition periods and associating a number of mass spectral peaks from different acquisition periods with a single ion species when the variation in mass to charge ratio (m/z) for the mass spectral peaks from acquisition period to acquisition period is consistent with an expected mass to charge ratio (m/z) variation over time based on an expected variation in calibration shift; and using the direct calibration measurements, the expected variation in calibration shift and the set of one or more intrinsic ion species to calculate the calibration shift of the mass spectrometry instrument at one or more time point(s) of interest other than the calibration time(s).

It is known that mass spectrometry instruments may lose accuracy over time. This is generally referred to as a calibration shift of the instrument, with the calibration shift introducing mass errors that can distort the recorded mass spectral data if not appropriately compensated for.

For instance, a mass spectrometry instrument acts to generate mass spectral data in the form of a sequence of mass spectra each including a number of mass spectral peaks showing the mass to charge ratio (m/z) values for any ion species present during the acquisition period (or "scan") in which the mass spectrum was recorded. However, the effect of the calibration shift is that the recorded mass to charge ratio (m/z) values may differ from the true mass to charge ratio (m/z) values. Thus, the instrument may need to be re-calibrated to correct the mass spectral data to account for such mass errors resulting from this calibration shift.

The calibration shift varies over time, for example due to fluctuations in temperature, and so on, which may affect the length of the flight tube (in a time-of-flight mass analyser). It will be appreciated that the calibration shift is also generally dependent on mass to charge ratio (m/z).

For instance, the calibration shift may be (and in various embodiments is) defined in terms of a pair of offset and gradient values. For the avoidance of any doubt, it will be understood that "offset" refers to a displacement in the measured value common to all ions at a particular time point. The offset thus affects all of the ions measured at a particular time point. The size of offset may however be, and typically is, dependent on mass to charge ratio (m/z). The size of the offset may also change (typically increase) over time. The "gradient" refers to the required scaling of the data, for instance to convert measured ion arrival times to corresponding mass to charge ratio (m/z) values, which may change from that determined during an initial instrument calibration. The offset and gradient thus together define how the recorded mass to charge ratio (m/z) value will be shifted from the actual or 'true' value for a particular ion species.

Thus, whilst various embodiments will be described in terms of a calibration shift, in embodiments this calibration shift comprises a pair of offset and gradient values defining the calibration shift. Any references herein to determining a calibration shift value may thus be understood in embodiments to comprise determining a pair of offset and gradient values defining the calibration shift.

However, it will be appreciated that this need not be the case. For instance, in embodiments the techniques presented herein may be used solely to correct for shifts in gradient, for example. This may help simplify the calculation of the calibration shift, and may provide a sufficient correction, especially where the change in offset is relatively insignificant.

Similarly, the techniques presented herein are not limited to correcting errors defined only in terms of offset and/or gradient and may generally be applied, through appropriate modeling, to any other suitable type of shift in the instrument calibration that may occur over time.

The present approach allows a calibration shift to be determined and hence corrected for at any time point(s) of interest using a combination of direct calibration measurements of the calibration shift at particular calibration times and measurements of intrinsic ion species that are present during the course of an acquisition such that they are present across multiple acquisition periods.

In particular, a value for the calibration shift for at least a first calibration time is directly determined using calibrants having known mass to charge ratio (m/z) values or previously mass measured mass to charge ratio (m/z) values. This value can then be extrapolated from the first calibration time to infer a value for the calibration shift any other time point(s) of interest before/after the calibration time(s) (or between two calibration times), in a manner that will be explained further below.

In embodiments, prior knowledge of the expected variation in calibration shift over time is used to give an initial range for the calibration shift over the interval between two time points. Measurements of intrinsic species present during the course of the acquisition may then be tracked by checking the consistency of the measurement at one time point with a previous measurement using a tolerance based on the expected range in calibration shift and the precision of the measurements.

Once a set of tracked intrinsic species is available, a value for the calibration shift can be calculated at any time point(s) of interest taking into account the complete set of intrinsic and extrinsic measurements.

After the calibration shift for a time point of interest has been determined in this way, an appropriate correction factor for correcting the calibration shift can then be determined accordingly.

In embodiments, the step of calculating the calibration shift of the mass spectrometry instrument at one or more time point(s) of interest other than the calibration time(s) is performed using (probabilistic) Bayesian methods, as will be explained further below.

It will be appreciated that the basic principle underlying Bayesian methods is that the information that is available for a particular system is a combination of what was already known about the system (the prior knowledge) and what new data is available to confirm or refine the prior knowledge. Any sources of uncertainty are represented as variables in the model. A prior probability distribution for an unknown variable (or set of variables) can thus be combined with new, relevant data in order to determine an updated "posterior" probability distribution for the variable(s), according to a standard set of procedures.

In essence, the prior probability distribution thus represents an initial model of the system taking into account any available (prior) information. When new data becomes available, this is used to update the initial model in order to determine a posterior probability distribution. The posterior probability distribution can in turn be used to infer useful representative values for the unknown variable(s) (e.g. calibration shifts in the present embodiments) and associated error-bars (uncertainties) and co-variances.

Thus, in embodiments, a prior probability distribution for the calibration shift at a particular time point is determined using prior knowledge of the known calibration shift at the calibration time(s) and the expected variation in calibration shift over time, e.g. between the calibration time(s) to the time point of interest. Introducing the measurements of intrinsic ion species updates the probability distribution of the calibration shifts (for all time points). The measurements of intrinsic ion species at the time point of interest thus represent new data that can be used to calculate an updated posterior probability distribution and to infer a value for the calibration shift at any time point(s) of interest.

It will be appreciated that the inferences at different time points are correlated. That is, measurements at any time point will affect the inferences at all other time points because of their interaction with the prior probability distribution associated with the expected variation in calibration shift which is defined continuously over time (and is therefore 'all-pervading'). This means that all the available data (from all time points) must generally be considered when inferring the shift at any particular time point. However, in practice, this effect may be relatively weak especially where there are large gaps between observations (measurements), and this will be reflected in the inferred uncertainties.

In other words, a posterior probability distribution for the calibration shift at a particular time point of interest is determined using prior knowledge of the known calibration shift at the calibration time(s) and the expected variation in calibration shift over time. The expected variation in calibration shift is defined continuously over time and so connects all measurement times (whether these are calibration time(s) or time points for which intrinsic ion species have been measured) and allows the model to be extended to time points for which no measurements exist.

This approach thus allows the calibration shift to be determined at any time point(s) of interest so long as a sufficient number of observations of intrinsic ion species are available such that the probability distribution can be updated and calibration shifts inferred at the time point(s) of interest with sufficient certainty, based on the available data (and without having to perform further calibration measurements). The use of such probabilistic methods also naturally allows an estimate of the uncertainties or errors associated with the posterior probability distributions and hence the calculated calibration shifts.

In particular, the above approach utilises measurements of intrinsic ion species as new data that can be used to refine an initial prior probability distribution over calibration shifts, as may be calculated based on the direct calibration measurements and the expected variation over time. It will be understood that "intrinsic" ion species may be ion species within or generated from a sample that is being mass analysed (in contrast to "extrinsic" ion species that are added into the instrument separately from the sample). Thus, in embodiments, a method comprises introducing a sample into the mass spectrometry instrument and obtaining mass spectral data by analysing the sample.

In embodiments, the above approach utilises measurements of persistent (or nearly persistent) intrinsic ion species. That is, the present approach may utilise measurements of intrinsic ion species that are present for at least a significant proportion of the acquisition. By "persistent" it is generally meant that the ion species are present across multiple acquisition periods. A "persistent" ion species should therefore be present in at least two adjacent acquisition periods. In embodiments the persistent ion species are present for at least about 50% of the entire acquisition duration (defined the plurality of acquisition periods) and/or at least 50% of the time between calibration events. Thus, in embodiments, only ion species that are present for at least about 50% of the acquisition duration are included in the set of intrinsic ion species and used when determining the calibration. This offers a balance between having enough ion species to use in the calibration methods whilst still ensuring that the behaviour can be reliably modeled over the course of the entire acquisition (comprising the plurality of acquisition periods), e.g. to be able to infer values for the calibration shifts with sufficient certainty.

Thus, in embodiments, at least some of intrinsic ion species may persist from the first acquisition period after a calibration time at least until the time point(s) of interest for which it is desired to determine a calibration shift. However, it will be appreciated that this need not be the case and the present approach is also readily able to utilise measurements of transient intrinsic ion species that are only present for a relatively short time duration.

For example, even if some of the intrinsic ion species are not continuously present up to the time point of interest, it is still possible to infer representative values for the calibration shifts at the time point of interest based on the continuity of the prior probability of the variation in calibration over time. That is, the expected variation in calibration shift can be used to bridge any gaps and effectively 'stitch' together observations at different acquisition periods to cover a larger time period of interest. For instance, the expected variation in calibration shift can be used to bridge the gap between a calibration time and the first measurement of an intrinsic ion species (such that it is not necessary for there to be any overlap between the calibrants used at the calibration time and the intrinsic ion species that are used to calculate the calibration shift), as well any other gaps for which no or only relatively few intrinsic ion species are present. Of course, if there are large gaps for which there are no observations that can be used to update the probability distributions, any inferences about time points in a gap will have larger associated uncertainties.

The recorded mass to charge ratio (m/z) values for the intrinsic species will of course differ from acquisition period to acquisition period due to the variations in calibration shift (since it is this variation that is corrected by the present techniques). In order to identify and use intrinsic ion species that appear in more than one acquisition period, the intrinsic ion species must therefore somehow be tracked across multiple acquisition periods with mass spectral peaks appearing at different time points (and potentially therefore having different mass to charge ratio (m/z) values) being ascribed to a single ion species having a single 'true' mass to charge ratio (m/z) value.

If the true mass to charge ratio (m/z) of an intrinsic ion species was known, this information could be used to aid the tracking of the species between different acquisition periods. However, typically at this point the mass to charge ratio (m/z) of the intrinsic ion species is unknown, or at best only very approximately known. Indeed, a benefit of the present approach is that the technique does not need to know the accurate mass to charge ratios (m/z) for the intrinsic ion species, as these can also be modeled as (unknown) variables and determined accordingly, for example, using the Bayesian methods described above.

Nonetheless, the mass spectral peaks (mass to charge ratio (m/z) values) associated with a single ion species will generally be clustered around the true mass to charge ratio (m/z) value. Further, the variation in mass to charge ratio (m/z) value between different acquisition periods will generally be bounded by the expected variation in calibration shift over time. The expected variation thus effectively provides a degree of tolerance that allows mass spectral peaks in adjacent acquisition periods to be matched and associated with one another as a single ion species of as yet unknown (or only approximately known) mass to charge ratio (m/z).

The expected degree of variation in mass to charge ratio (m/z) over time may be obtained based on a pre-characterisation of the instrument. For instance, in such pre-characterisation the instrument may be operated with known calibrants in an environmental chamber that is designed to simulate the typical in-use conditions. The environmental chamber may be driven so as to emulate the ambient conditions in the end user's laboratory.

However, other arrangements would however be possible. For instance, the expected variation may be obtained through computer simulations, or any other suitable pre-characterisation techniques.

Thus, in embodiments, the expected mass to charge ratio (m/z) variation over time is determined based on a predetermined function describing an expected variation in calibration shift for the instrument over time. That is, according to the above approach, the ion species are tracked using prior knowledge of the expected degree of variation in mass to charge ratio (m/z) over time.

In particular, intrinsic ion species that are present across multiple acquisition periods may be identified by associating ion peaks from different acquisition periods with one another based on the variation in mass to charge ratio (m/z) between the acquisition periods being consistent with the expected variation. For instance, where the mass to charge ratios (m/z) for two or more peaks follow the expected variation, at least within associated error values for the peaks, those peaks may be grouped together and identified as being associated with the same ion species.

It will be appreciated that the tracking of ion species is therefore probabilistic and the mass spectral peaks that are grouped together and identified as belonging to a single ion species in this way are merely determined as being likely to belong to the same ion species. This approach will work well for most ion species as the assumption that mass spectral peaks for a particular ion species will follow the expected mass to charge (m/z) variation will generally hold true. However, some of the ion peaks may not in fact correspond to the same ion species, or may have been affected by interference from other peaks. The techniques described herein allow outlier rejection, as will be explained further below, to mitigate this and to allow some ion species to be discarded from the determination of the calibration shift when they are inconsistent with the other ion species.

To find the calibration shift at a particular time point of interest it is necessary to have some prior knowledge of the calibration shift for at least one time point. Thus, according to the present technique, direct calibration measurements of the calibration shift are performed at one or more calibration time(s). The direct calibration measurements may for instance be performed using external or extrinsic lock mass calibrants having a known mass to charge ratio (m/z) values or previously mass measured mass to charge ratio (m/z) values.

It would also in principle be possible to use direct calibration measurements of intrinsic ions from or within the sample but having a known mass to charge ratio (m/z) values or previously mass measured mass to charge ratio (m/z) values. For instance these may be exogenous species added to the sample prior to ionisation, or may be present as background ions. In that case, rather than using a combination of external and intrinsic calibration measurements, the calibration procedure may use a combination of known and unknown intrinsic ion species.

When the calibration shift is defined in terms of a pair of offset and gradient values it may be necessary to obtain calibration measurements of at least two known calibrant species. Typically at least two lock mass measurements are therefore required at each calibration time in order to anchor the offset and gradient at that calibration time. However, this could also in principle be done by performing two lock mass measurements at different calibration times, e.g. which are sufficiently close with respect to the expected variation in calibration.

Each intrinsic ion species identified in the manner described above may be stored as a set of time-labeled mass to charge ratio (m/z) measurements. Thus, for each time point of interest, there is a set of recorded mass to charge ratio (m/z) measurements corresponding to the intrinsic ion species present at that time point. There is also the prior knowledge of the calibration shift at the direct calibration times and the expected variation in calibration shift over time, which together can be used to give an initial prior estimate of the calibration shift at any particular time point of interest. The expected variation in calibration shift over time can thus be used to determine a prior probability distribution for the calibration shifts at a time point of interest.

Using a Bayesian approach, the prior probability distribution that has been estimated by the prior knowledge of the calibration shift at the direct calibration times and the expected variation in calibration shift over time may then be refined using the new data that has been obtained in the form of the measurements of the intrinsic ion species. For instance, once a sufficient number of suitable intrinsic ion species have been identified, a model for the mass spectral data set can then be generated in terms of a set of unknown mass to charge ratio (m/z) values for a set of intrinsic ion species and an unknown calibration shift at each point in time.

The model can then be evaluated in order to solve for the values of mass to charge ratio (m/z) values and calibration shift that 'best' match the measured data and the prior expectation of the calibration shifts over time.

In particular, this may involve determining an updated probability distribution for the calibration shifts and the mass to charge ratios for a set of intrinsic ion species based on the measured mass to charge ratios for the intrinsic ion species and the prior knowledge of the known calibration shift at the one or more calibration time(s) and the expected mass to charge ratio variation of the intrinsic ion species over time.

An updated probability distribution can thus be determined that effectively represents the simultaneous probability distributions for the calibration shift and mass to charge ratios (m/z) of the intrinsic ion species over all time points. In particular, the updated probability distribution that is determined may be an un-normalised posterior probability distribution representing the distributions for both the unknown calibration shift and unknown mass to charge ratios (m/z) of the intrinsic ion species.

It will be appreciated that the un-normalised posterior probability distribution may be normalised to give a normalised posterior probability distribution in the usual manner. However for the purposes of using and evaluating the updated probability distribution it is not strictly necessary to normalise it.

The updated (e.g. un-normalised posterior) probability distribution for the calibration shifts and mass to charge ratios (m/z) for the set of intrinsic ion species can then be suitably characterised e.g. by integrating over the calibration shifts and mass to charge values to assign a likelihood for the model upon which the updated probability distribution is based, in view of the known information (the prior probability distribution and the measured intrinsic ion species).

For instance, once an updated probability distribution has been determined using a given set (or subset) of intrinsic ion species (a particular model), it is then possible to evaluate the marginal likelihood for that probability distribution (the "evidence") by integrating the joint probability distribution over the variable (unknown) calibration shift and mass to charge ratios for the intrinsic ion species. In embodiments, this comprises integrating the (joint) updated probability distribution over the unknown calibration shift and mass to charge ratios for the intrinsic ion species within the set to determine a marginal likelihood associated with the posterior probability distribution.

Evaluating the marginal likelihood (evidence) in this way allows multiple models generated using different combinations (sets/subsets) of included/excluded intrinsic ion species to be compared in order to remove outliers and interferences. For instance, since the tracking and identifying of the intrinsic ion species is based on an expected variation in mass to charge ratio (m/z), as discussed above, some of the peaks may be incorrectly assigned together. Or, there may be other interferences that distort the measurements for some of the intrinsic ion species such that they are inconsistent with the expected behaviour and/or the other identified ion species.

In such cases these measurements may not aid in modeling the system, and may be considered outliers. Desirably these outliers would therefore be rejected in order to improve confidence in the calibration shift inferred from the posterior probability distribution.

The use of the probabilistic approach outlined above allows such outliers to be suitably down-weighted and effectively discarded. For instance, once the marginal likelihood has been determined for a particular model using a particular set or subset of intrinsic ion species, the process can be repeated for a different set or subset of listed ion species, and so on, in order to determine the model, defined in terms of a particular set of included/excluded intrinsic ion species, that has the highest marginal likelihood (evidence value). Thus, the method may comprise comprising evaluating marginal likelihoods based on a plurality of different sets/subsets of intrinsic ion species to determine which set/subsets of intrinsic ion species to use when determining the updated probability distribution for calculating the calibration shift at the time point(s) of interest.

A value for the calibration shift at a particular time point of interest may thus be determined in the manner described above, and then used to determine a suitable correction factor for correcting the mass spectral data. The correction factor may comprise a mass, mass to charge ratio or time correction factor. For instance, it will be appreciated that the mass spectrometer may generally measure any of mass, mass to charge ratio, or time, with these generally being convertible between each other. Thus, the mass spectral data and the correction factors may be stored and processed as a set of mass, or time, values, rather than mass to charge ratios.

The correction factor can then be used to correct the mass spectral data. Thus, in embodiments, the method comprises generating a first mass spectral data set and correcting the mass, mass to charge ratio or time of at least a portion of the first mass spectral data set using the determined correction factor in order to generate a second corrected mass spectral data set.

The mass spectral data may be directly obtained from the mass spectrometry instrument and processed 'on-the-fly'. However, it is also the case that the mass spectral data may first be stored and then retrieved for subsequent processing.

From another aspect there is provided a method of mass spectrometry comprising: using a mass spectrometry instrument to obtain mass spectral data; and correcting the obtained mass spectral data using an approach according to any of the embodiments described herein.

A further aspect relates to a mass spectrometer comprising: a mass analyser for obtaining mass spectral data; and a control circuit configured to correct the obtained mass spectral data using an approach according to any of the embodiments described herein.

According to the approaches described herein, the calibration shift, and the mass to charge ratio (m/z) values of the intrinsic species, at any time point of interest can thus be inferred using the direct calibration measurements and the expected mass to charge ratio variation of the intrinsic ion species over time provided that a sufficient number of intrinsic ion species are present at the time point of interest.

This means that a suitable correction factor for correcting the calibration shift can be determined at any time points of interest before/after a calibration event thereby reducing the frequency at which the calibration measurements need to be performed whilst still enabling a reliable correction of the calibration shift.

Thus, compared to known extrinsic calibration methods, the above approach advantageously reduces the frequency at which external calibration measurements should be performed, in turn reducing the need to interrupt the analysis of interest.

Further, the above approach differs from more conventional intrinsic calibration methods in that the method utilises intrinsic species of potentially unknown mass to charge ratio (m/z) and which may only be present for a portion of the acquisition duration, rather than relying on background ions of known mass to charge ratio (m/z) which are present during the whole of an acquisition and which may interfere with the analyte species of interest.

Thus, it will be appreciated that the above approach provides various improvements compared to other known calibration methods.

BRIEF DESCRIPTION OF THE DRAWINGS

Various embodiments will now be described, by way of example only, and with reference to the accompanying drawings in which:

FIGS. 9, 10, 11, 12 and 13 illustrate some calibration results according to various embodiments.

DETAILED DESCRIPTION

Figure 1:
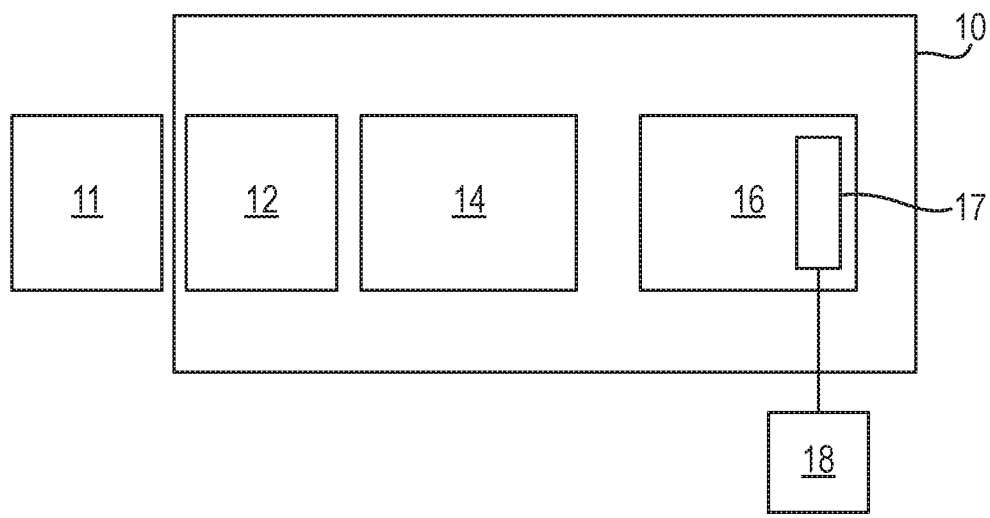
FIG. 1 shows an example of a mass spectrometer which may be used to generate mass spectral data sets according to an embodiment.

FIG. 1 shows an example of a mass spectrometry instrument 10 which may be used to generate mass spectral data sets according to various embodiments. The mass spectrometry instrument 10 generally includes an ion source 12 that acts to generate ions for analysis by a mass analyser 16.

Various other ion guiding or manipulating devise 14 may be provided between the ion source 12 and mass analyser 16, as is generally known. For instance, in embodiments the mass spectrometry instrument may further comprise (i) one or more ion guides; (ii) one or more ion mobility separation devices and/or one or more Field Asymmetric Ion Mobility Spectrometer devices; and/or (iii) one or more ion traps or one or more ion trapping regions. Thus, it will be appreciated that FIG. 1 is only schematic and the mass spectrometer may comprise any further desired components.

Any suitable ion source 12 may be used. For instance, the ion source 12 may generally be selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; and (xxx) a Low Temperature Plasma ("LTP") ion source.

The mass spectrometry instrument 10 in FIG. 1 also comprises a chromatography or other separation device 11 arranged upstream of the ion source 12. The chromatography or other separation device 11 may comprise a liquid chromatography or a gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device. However, the presence of such chromatography or other separation device 11 is optional and in embodiments may be omitted.

Any suitable mass analyser 16 may be used. However, in embodiments the mass analyser 16 may be a time of flight mass analyser, and in particular the mass analyser 16 may comprise a time of flight mass analyser having a relatively extended flight path such as a multi-reflecting time of flight mass analyser. In that case it will be appreciated that the problem of calibration shift may be particularly significant especially since some known calibration techniques rely on repeatedly interrupting the data acquisition in order to perform extrinsic calibration measurements which will present significant duty cycle issues when the acquisition periods are relatively long.

The ions that pass to the mass analyser 16 are then recorded using a detector 17 in order to generate a series of mass spectra. Each mass spectrum includes a set of peaks corresponding to the mass to charge ratio (m/z) values for the ions that were present during the acquisition period for which the mass spectrum was recorded. Typically a large number of mass spectra are obtained over time from a single sample during the course of an acquisition.

The ion signals recorded using the detector 17 is then passed to a suitable processor 18. The processor 18 comprises re-calibration circuitry, the function of which will now be described.

For instance, it is known that variations in instrument calibration (usually driven by temperature changes) can lead to mass errors such that the mass to charge ratio (m/z) values for the recorded peaks are shifted from their 'true' values. It is thus desirable to be able to correct for this calibration shift.

According to the present embodiments mass errors associated with variation in instrument calibration that may result from temperature changes, etc., are corrected using a combination of direct calibration measurements and measurements of intrinsic ion species.

In many cases a linear recalibration of $\sqrt{m/z}$ is adequate. To achieve this, the extrinsic "lock-mass" data is an acquisition of two known species to provide both offset and gradient information. Within the analyte acquisition long-lived, intrinsic species are tracked with measurements of species extending over more than 50% of the acquisition duration being retained as input to the re-calibration "solving" procedure. The 50% proportion is a pragmatic choice balancing the need for a reasonable number of tracked species to give sufficient statistical accuracy to the re-calibration.

In both the tracking and solving procedures prior knowledge of the expected degree of variation is employed. In this case, the prior knowledge is expressed as a 2×2 covariance matrix per unit time, one dimension for each of offset and gradient. In the tracking procedure this covariance matrix is used to determine a (rather slack) tolerance to allow peaks in consecutive time points to be matched. In the solving procedure the covariance matrix defines the prior probability distribution of offset and gradient at a particular time point given their values at some other time point (see FIG. 2).

Figure 2:
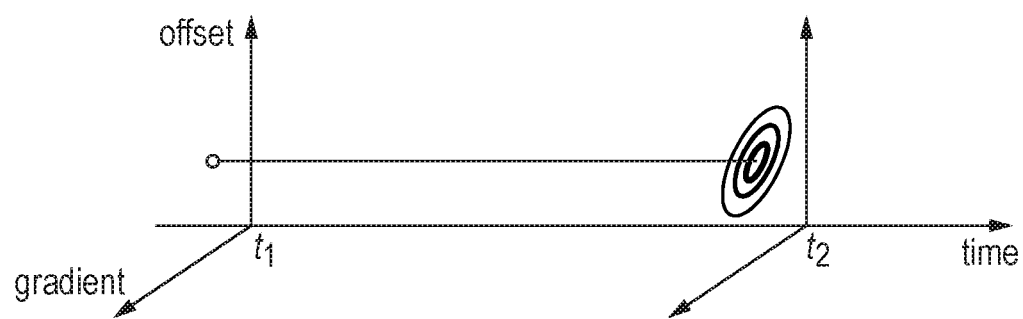
FIG. 2 illustrates how the mass spectrometer calibration may shift as a function of time.

FIG. 2 thus illustrates how the mass spectrometer calibration may shift as a function of time. In particular, as shown in FIG. 2, definite knowledge of the offset and gradient at time $t_1$ spreads out over time into the probability distribution indicated by the contour lines at time $t_2$. The contours are defined by a covariance matrix per unit time multiplied by the time difference, $|t_2-t_1|$.

The covariance matrix representing the variation in the instrument calibration may be arrived at by analysing calibrant data collected in an environmental chamber where the temperature is driven according to a schedule reflecting the operation of the air conditioning in customer laboratories.

Thus, in order to determine the calibration shift at a particular retention time of interest, the calibration shift must be accurately known for at least one time period. This can be determined using any suitable direct calibration technique which may for example involve making direct calibration measurements from one or more multi-point lock mass acquisitions using external lock mass components, or from one or more quality control peptide and fragments, if available.

To move from the lock mass measurements at the calibration time to different time periods some prior knowledge of the expected variation in calibration shift over time is required. This information may be obtained during an initial calibration set-up (performed by the manufacturer) by analyzing calibrant data collected in an environmental chamber where the temperature is driven according to a schedule reflecting the operating conditions in the end user's laboratory.

Figure 3:
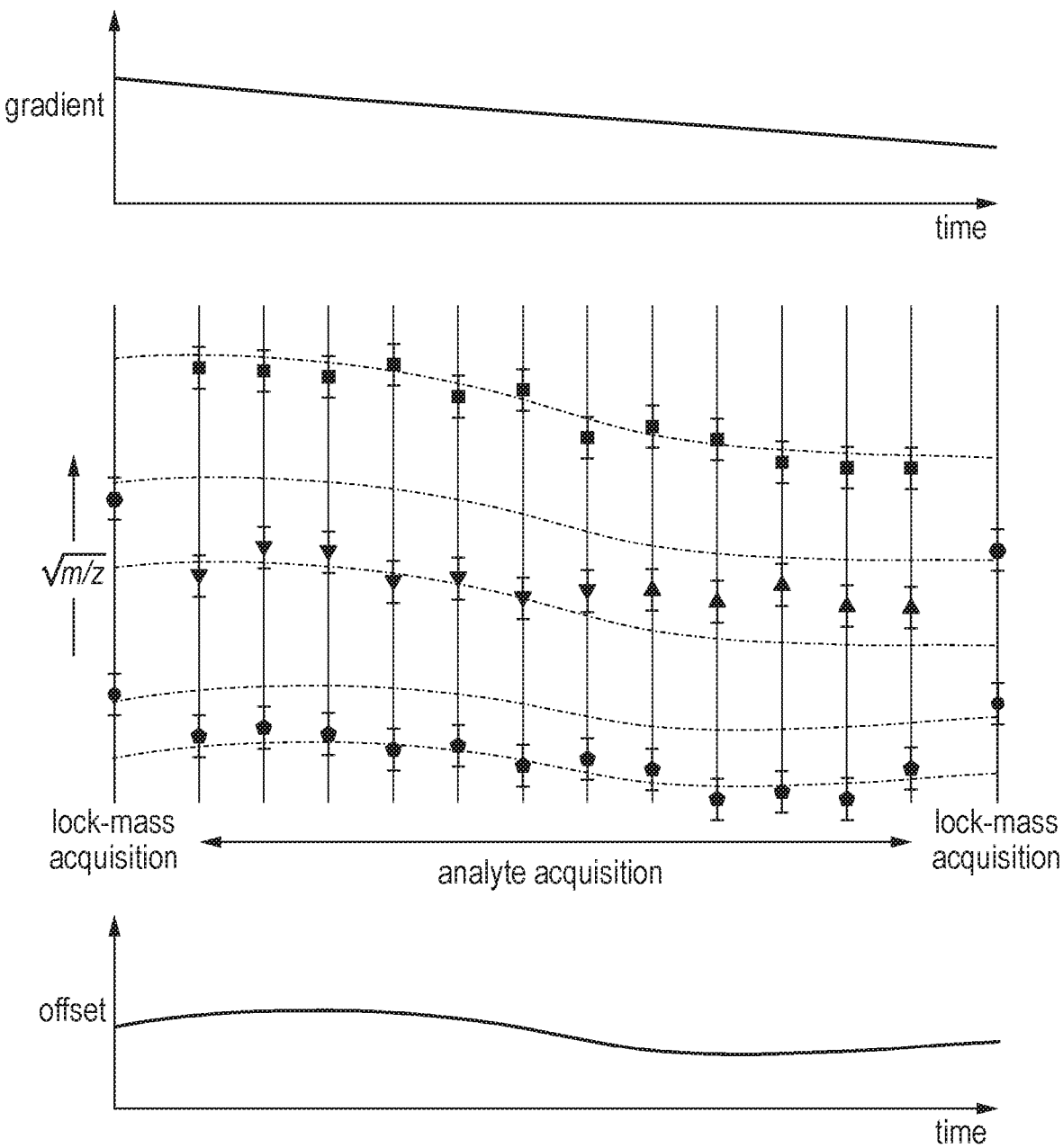
FIG. 3 shows an example of a possible acquisition scenario to which the present embodiments may be applied.

A possible scenario for data acquisition is shown in FIG. 3. Changes in offset and gradient both affect the deviation of $\sqrt{m/z}$ values from their original calibrated values. Each measurement is accompanied by an error-bar indicating its precision. The analyte acquisition is bracketed by two lock-mass acquisitions. The aim is to provide a method that can adjust for the variation in offset and gradient without requiring additional lock-mass scan acquisitions but using species intrinsic to the analyte but which are of unknown m/z. In FIG. 3 the ion species are persistently present across a significant proportion of the acquisition (although this need not be the case and the approach described herein can also use observations of transient species that are only temporally present). As shown in FIG. 3, the persistent intrinsic species can be tracked with the lower and upper m/z species being consistent with each other and the, as yet undetermined, drift of the instrument calibration. The middle m/z species deviates in the latter half of the analyte acquisition, perhaps because of interference from close-lying transient species.

FIG. 3 thus shows an example of a typical acquisition scenario: the drifts in the offset and gradient over time are shown in the lower and upper graphs, respectively. The effect of these drifts on the measurements of both lock-mass and analyte acquisitions is shown in the central plot for two extrinsic lock-mass $\sqrt{m/z}$ values (circles and hexagons) and three intrinsic $\sqrt{m/z}$ values (squares, triangles and pentagons). The upward pointing triangle in the middle intrinsic species indicate that, even though these values have been tracked and associated as one species, their pattern of displacement does not agree with the drift associated with their approximate $\sqrt{m/z}$ value and, importantly, with the other tracked species.

The solving procedure takes as input the time-labeled measurements of the lock-mass data, the tracked intrinsic species along with the prior knowledge embodied in a covariance matrix to produce an offset and gradient for each time point. It is capable of rejecting species which do not agree with the bulk of the measurements so that they do not skew the output.

According to the present embodiments, a Bayesian approach is adopted as some prior knowledge of the variation in offset and gradient over time must be assumed in order to move from lock-mass measurements acquired at a different time to the analyte masses that will be corrected (this might be established by characterization of variations in data acquired using an environmental chamber), and also since some measurements will be affected by undetected interferences and should be rejected. This involves comparison of models of the system with different patterns of measurement rejection which should be achieved by Bayesian model comparison.

Figure 4:
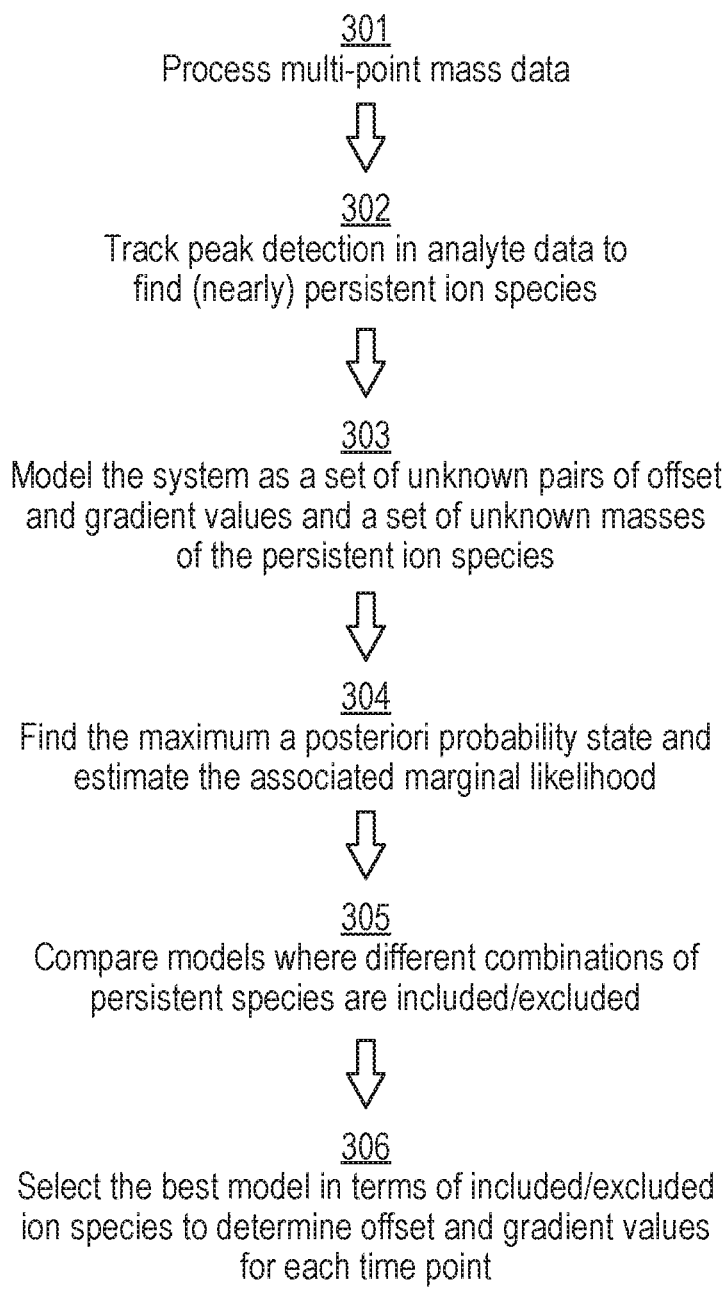
FIG. 4 is a flow chart outlining the overall method according to an embodiment.

In outline, as shown in FIG. 4 an exemplary method according to an embodiment comprises the following steps. To find the offset and gradient at a particular retention time, both quantities need to be anchored at a minimum of one retention time. This information could come from one or more multi-point lock-mass acquisitions or from one or more "QC" peptides and their fragments, if available. Thus, first, a step is performed of processing multi-point lock-mass data (step 301).

Peak detections in analyte data are then tracked to find persistent (or nearly persistent) species (step 302). To be able to track persistent (or nearly persistent) species an estimate of the deviation of the species measured mass must be provided. This may be given in the form of a covariance matrix per unit time for the offset and gradient. The tolerance may be further restricted both above and below to make the tracking robust. Data from several scans may be combined to improve measurement statistics while maintaining sufficient granularity in the sampling of acquisition time to map out the variations in offset and gradient.

The system is then modeled as a set of unknown (offset, gradient) pairs and a set of unknown masses of the intrinsic ion species (step 303). It is appropriate to do all calculations when modeling the system in terms of square root of calibrated m/z as this removes any offset present when the instrument was calibrated. The maximum posterior probability state is then found and used to estimate the marginal likelihood (i.e. "evidence") while allowing for some inflation of the error bars provided by the peak detection results and the co-variances associated with the prior (step 304).

Different models where different combinations of intrinsic ion species have been excluded (or heavily down-weighted) are then compared so that outliers and interferences may be removed (step 305). The best model in terms of included/excluded species is then used to produce an offset and gradient for each time point (step 306).

As for the tracking procedure, a metric (inverse covariance matrix), $C^{-1}(\Delta t)$, is needed that defines the variability of the offset and gain over time in order to evaluate the model. This information may be provided in the form of a 2×2 covariance matrix per unit, so that $C(\Delta t)=|\Delta t|C(1)$. A covariance matrix, $C_0$, (or equivalent) may also be provided for the start of the acquisition, $t_0$, or some other known time point to completely define a prior probability distribution over offset and gradient at any time, t, relative to $t_0$.

The offset and gradient at a particular time may be represented by $$\underline{\beta}_t = \begin{bmatrix} \delta_t \\ \gamma_t \end{bmatrix},$$

so that, $$Pr(\underline{\beta}_0) = [\det(2\pi C_0^{-1})]^{-1/2} \exp[-\tfrac{1}{2}\underline{\beta}_0^T C_0^{-1} \underline{\beta}_0]$$

and $$Pr(\underline{\beta}_t | \underline{\beta}_0) = [\det(2\pi C_t^{-1})]^{-1/2} \exp[-\tfrac{1}{2}(\underline{\beta}_t - \underline{\beta}_0)^T C_t^{-1} (\underline{\beta}_t - \underline{\beta}_0)].$$

The "scans" are labeled sequentially in time with index k with times $t_k$ so that $C_k = |t_k - t_{k-1}| C(1)$ for k>0. The scans considered here may be the result of combing a range of consecutive scans. A scan, k, with lock-mass information, $L_k$, associated with it has a set of triples, $\{\lambda_j, l_{jk} \pm \sigma_{jk}\}$, for $j \in L_k$. The members of the triple are reference value, observed value and its error bar, respectively.

During the acquisition a number of intrinsic species may be present, indexed with $i \in X_k$, with values $x_{ik} \pm \sigma_{ik}$ corresponding to unknown true values, $\xi_i$. Strictly speaking, there should be a prior probability distribution, $Pr(\xi_i)$, associated with each $\xi_i$. Here, it is assumed that this prior is sufficiently broad so as not to significantly affect the likelihood.

This gives, $$Pr(l_{jk}|\lambda_j,\underline{\beta}_k) = [2\pi\sigma_{jk}^2]^{-1/2} \exp[-\tfrac{1}{2}(l_{jk} - \delta_k - (1+\gamma_k)\lambda_j)^2 / \sigma_{jk}^2]$$

and similarly, $$Pr(x_{ik}|\xi_i,\underline{\beta}_k) = [2\pi\sigma_{ik}^2]^{-1/2} \exp[-\tfrac{1}{2}(x_{ik} - \delta_k - (1+\gamma_k)\xi_i)^2 / \sigma_{ik}^2].$$

Putting it all together, a joint probability distribution can be determined for the unknown calibration shift for scan k, $\beta_k$, the measured lock masses, $l_k$, the measured intrinsic ions within set i, $x_{ik}$, and the underlying mass to charge ratio (m/z) values for the intrinsic ions, $\xi_i$, as:

$$Pr(\{\underline{\beta}_k\}, \{l_{jk}\}, \{x_{ik}\}, \{\xi_i\}) = Pr(\{\xi_i\}) z_\beta^{-1} z_l^{-1} z_x^{-1} \exp\left[-\frac{Q(\xi,\beta)}{2}\right],$$

where $$Pr(\{\xi_i\}) \approx \text{constant}, z_\beta^{-1} = \Pi_k [\det(2\pi C_k^{-1})]^{-1/2}, z_l^{-1} = \Pi_k \Pi_{j \in L_k}[2\pi\sigma_{jk}^2]^{-1/2}, z_x^{-1} = \Pi_k \Pi_{i \in X_k}[2\pi\sigma_{ik}^2]^{-1/2}$$

and $$Q(\underline{\xi},\underline{\beta}) = \Sigma_k \Sigma_{j \in L_k} (l_{jk} - \delta_k - (1+\gamma_k)\lambda_j)^2/\sigma_{jk}^2 + \Sigma_k \Sigma_{i \in X_k} (x_{ik} - \delta_k - (1+\gamma_k)\xi_i)^2/\sigma_{ik}^2 + \underline{\beta}_0^T C_0^{-1} \underline{\beta}_0 + \Sigma_{k>0}(\underline{\beta}_k - \underline{\beta}_{k-1})^T C_k^{-1} (\underline{\beta}_k - \underline{\beta}_{k-1})$$

The joint probability distribution can be maximised as a function of $\underline{\xi}, \underline{\beta}$ by minimising the function $Q(\underline{\xi},\underline{\beta})$ in order to determine 'best' estimates of the unknown background values, $\hat{\underline{\xi}}$, and the offset and gradient for all time points, $\hat{\underline{\beta}}$. The minimisation of $Q(\underline{\xi},\underline{\beta})$ may generally performed according to any suitable technique.

For instance, it will be appreciated that the minimisation of $Q(\underline{\xi},\underline{\beta})$ is a non-linear problem, since both $\underline{\xi},\underline{\beta}$ are unknown. One way to solve this is to divide this into two linear problems, for example, by choosing a starting set $\underline{\xi}^{(0)}$, and solving the linear system $\nabla_\beta Q(\underline{\xi}^{(0)},\underline{\beta})=0$ in terms of $\underline{\beta}$ to find $\underline{\beta}^{(0)}$, then solving the linear system $\nabla_\xi Q(\underline{\xi},\underline{\beta}^{(0)})=0$ in terms of $\underline{\xi}$ to find $\underline{\xi}^{(1)}$, and so on. This alternating method converges slowly but is effective at finding a point within the region of convergence of a quadratically convergent method such as Newton's method. The starting set, $\underline{\xi}^{(0)}$, can be produced by a weighted average of adjusted square root masses favouring those measurements closer in time to lock-mass scans.

It is then possible to characterise the joint probability distribution by calculating the associated evidence (marginal likelihood) for the joint probability distribution by integrating over the unknown values $\underline{\xi},\underline{\beta}$. It is assumed that the joint probability distribution is substantially Gaussian, such that an estimate for the evidence can be calculated via the Laplace approximation, $$\int \int Pr(\{\underline{\beta}_k\}, \{l_{jk}\}, \{x_{ik}\}, \{\xi_i\}) d\underline{\xi} d\underline{\beta} \approx$$

$$Pr(\{\xi_i\}) z_\beta^{-1} z_l^{-1} z_x^{-1} \exp\left[-\frac{Q(\hat{\xi},\hat{\beta})}{2}\right] \det\left(2\pi \left[\frac{\nabla^Z Q}{2}\right]_{\hat{\underline{\xi}},\hat{\underline{\beta}}}^{-1}\right)^{1/2}.$$

Other approaches for evaluating the posterior probability distribution would of course be possible. For instance, the above approach uses a Gaussian approximation around the maximum a posteriori probability estimate. This has been found to work well in many cases, since in many cases the posterior probability distribution will be substantially Gaussian. However, other suitable methods could also be used for evaluating and characterising the posterior probability distribution, including but not limited to Variational Bayesian methods or Markov chain Monte Carlo methods. It will also be appreciated that if the calibration shift is defined solely in terms of gradient, for example, the evidence could then be calculated more easily without having to use such an approximation. Thus, it will be understood that the above approach is merely one example of how the posterior distribution of the family of calibration shifts can be characterised, but other approaches are also contemplated.

Once an evidence is available alternative models can then be assessed in terms of different sets, i, of included/excluded intrinsic ion species. For instance, excluding an ion species from the model might involve inflating all the error bars associated with the species, so that it is effectively removed from the estimation of the calibration shift.

The set of included/excluded intrinsic ion species having the highest evidence (marginal likelihood) could be selected.

However, with 100 species, there would then be more than $10^{30}$ configurations to try. Thus, rather than doing this, it may be desirable to instead explore the "posterior bubble" of possibilities, e.g. through Markov Chain Monte Carlo (MCMC) sampling.

For instance, in embodiments, exploration of the included/excluded species may be performed by Gibbs sampling as inclusion/exclusion of species corresponds to exploration of a set of binary switches with associated probabilities. For instance, each ion species may be taken in turn and if a species is marked as 'good' (such that it should be included in the model), the error bars on its associated peaks are suitably inflated. On the other hand, if an ion species is marked as 'bad', its evidence is recalculated, multiplied by the prior probability of it being bad, and then compared with the corresponding value when it was marked as good. The switch is accepted using the Gibbs acceptance rule. The process would be similar when switching from bad to good except that the error bars would be deflated and the priors on good/bad the other way round.

For example, there may be a prior probability, p, of a species being 'good'. If, for a particular model, there are n good species and (N–n) bad species, the evidence is then multiplied by $p^n(1-p)^{(N-n)}$ to give the joint probability distribution for the good/bad assignments and the data. This probability distribution can then be suitably explored using Gibbs sampling, e.g. for a number of iterations, to find a local maximum.

Various other approaches would of course be possible. For instance, it would also be possible to use these joint probabilities to weight the sampling of representative values of the shifts.

Thus, other techniques for exploring the sets of included/excluded species may of course also be used to assess different models and to allow outlier observations to be discarded appropriately.

It is noted that the error bars, variances and co-variances in the above may be overly restrictive and lead to an inappropriately low value for the evidence. Broad brush mitigation of this danger may be achieved by introducing a scale factor for all variance elements and an associated probability distribution. This may in turn allow for a more realistic (pessimistic) estimation of the errors associated with the model.

For instance, if there is a total of $N_L$ lock-mass measurements, $N_X$ tracked ion measurements of I species and K scans then there are $-\frac{1}{2}(N_L+N_X+2K-I-2K) = -\frac{1}{2}(N_L+N_X-I)$ powers of the variance scale factor in the expression for the evidence. Explicitly, a scale factor may be introduced to $\upsilon \geq 1$ with the varying part of the evidence written as $$E(\upsilon) = (p-1)\upsilon^{-\left(\frac{N}{2}+p\right)}z^{-1}z_{\hat{Q}}\exp\left[-\frac{\hat{Q}}{2\upsilon}\right]$$

where $N = N_L + N_x - I$, $z = z_\beta z_d z_x$, $z_{\hat{Q}} = \det\left(2\pi\left[\frac{\nabla^2 Q}{2}\Big|_{\hat{\xi},\hat{\beta}}\right]^{-1}\right)^{1/2}$, $\hat{Q}=Q(\hat{\xi},\hat{\beta})$ and p>1 is the parameter in the prior probability distribution for $\upsilon$, $Pr(\upsilon|p)=(p-1)\upsilon^{-p}$.

It is found that for $\hat{Q}>0$ $$E = \int_1^\infty E(\upsilon)d\upsilon = (p-1)z^{-1}z_{\hat{Q}}\left(\frac{\hat{Q}}{2}\right)^{-\left(\frac{N}{2}+p-1\right)}\Gamma\left(\frac{N}{2}+p-1;\frac{\hat{Q}}{2}\right),$$

where the incomplete gamma function $\Gamma(a;x) = \int_0^x t^{a-1}e^{-t}dt$, or $$E = (p-1)z^{-1}z_{\hat{Q}}\left(\frac{N}{2}+p-1\right)$$

for the exceptional case $\hat{Q}=0$.

For the purpose of calculating co-variances on the output offsets and gradients the estimate $$\hat{\upsilon} = \max\left(1, \frac{\hat{Q}/2}{p+N/2}\right)$$

is used.

The model with the highest evidence (marginal likelihood) can then be used to determine the calibration shift. The error associated with this value also naturally falls out of the probabilistic approach described above, and thus can readily be estimated and provided as output along with the calibration shift value. For instance, if the error is too high, it may be indicated that the calibration method has not worked and the user may be prompted to obtain more measurements to provide new data (intrinsic ion species) that can be used to refine the model.

Results

Various results will now be described to illustrate the approach according to the present embodiments.

Figure 5:
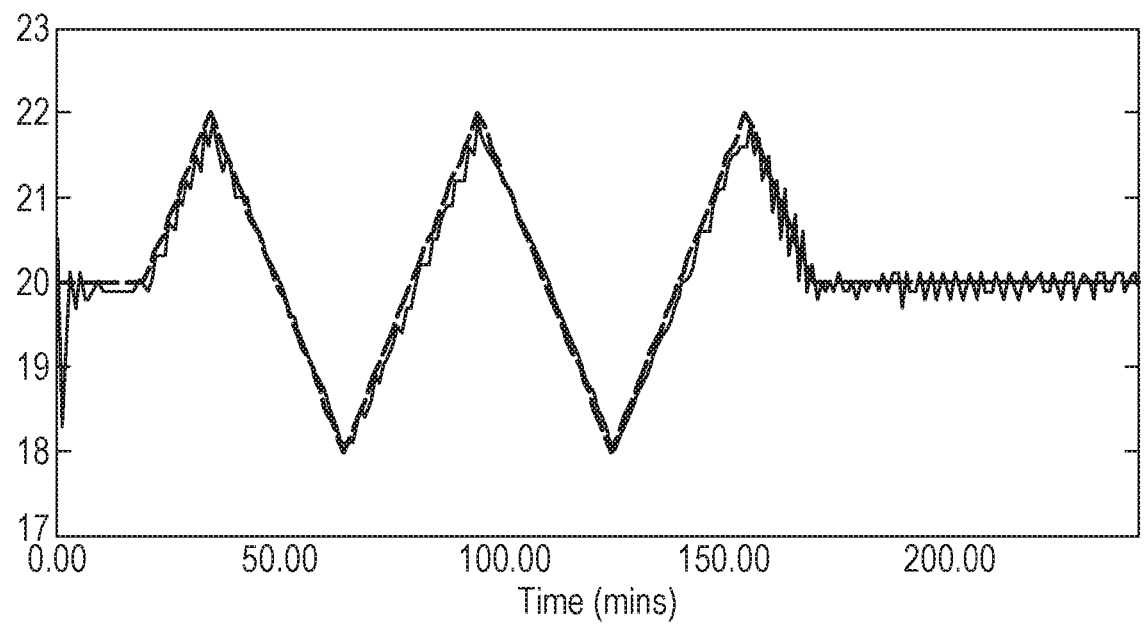
FIG. 5 shows an example of a temperature profile for an environmental chamber that may be used to characterize the expected calibration shift for a mass spectrometer according to an embodiment.

A sequence of eight 30 minute acquisitions of a sodium iodide calibrant solution were made in an environmental chamber programmed with the temperature profile shown in FIG. 5.

Figure 6:
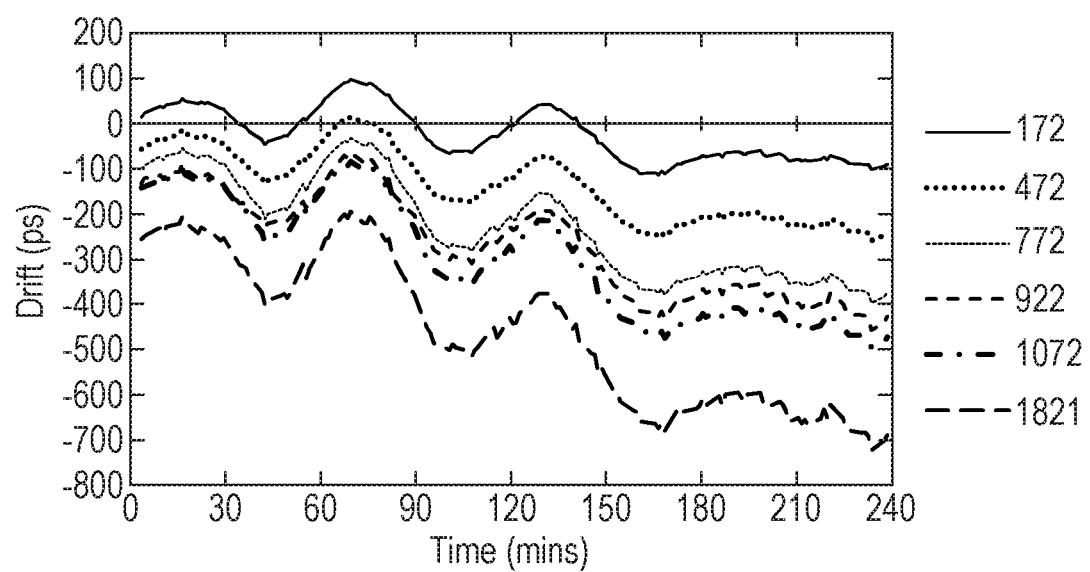
FIGS. 6, 7 and 8 show the results of such characterization.
Figure 7:
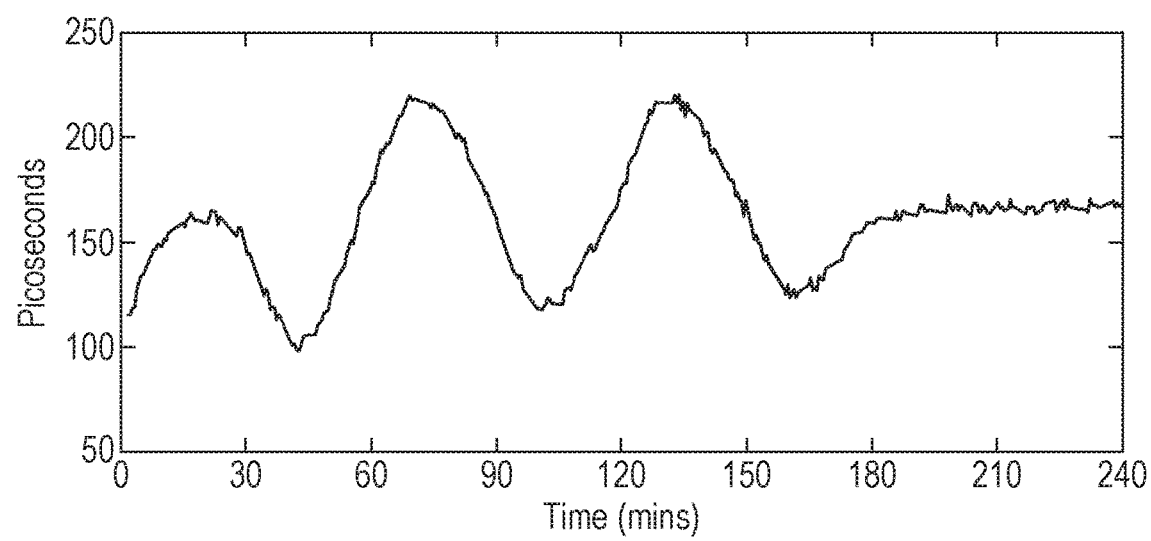
Figure 8:
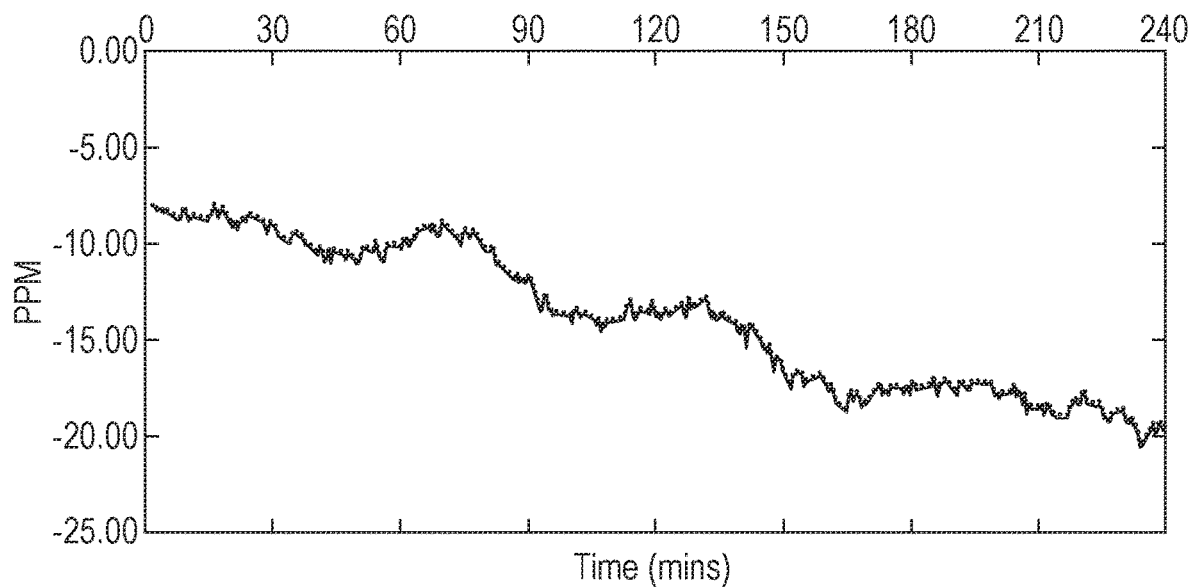

FIG. 6 shows the deviations of six of the calibrated arrival times from their reference values (data were combined over a 30 second window around time points separated by 30 seconds). FIG. 7 and FIG. 8 show the offsets and gradients produced by fitting the arrival times of the six species using their known masses. This overlays almost exactly the offsets and gradients produced by the solving procedure when the same six species are used as input.

Figure 9:
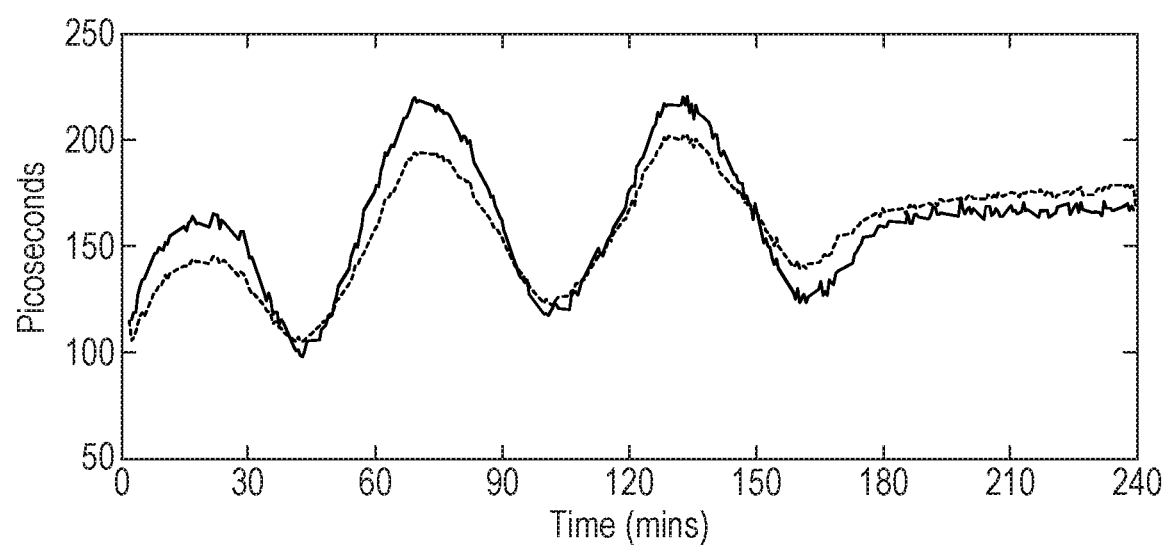
Figure 10:
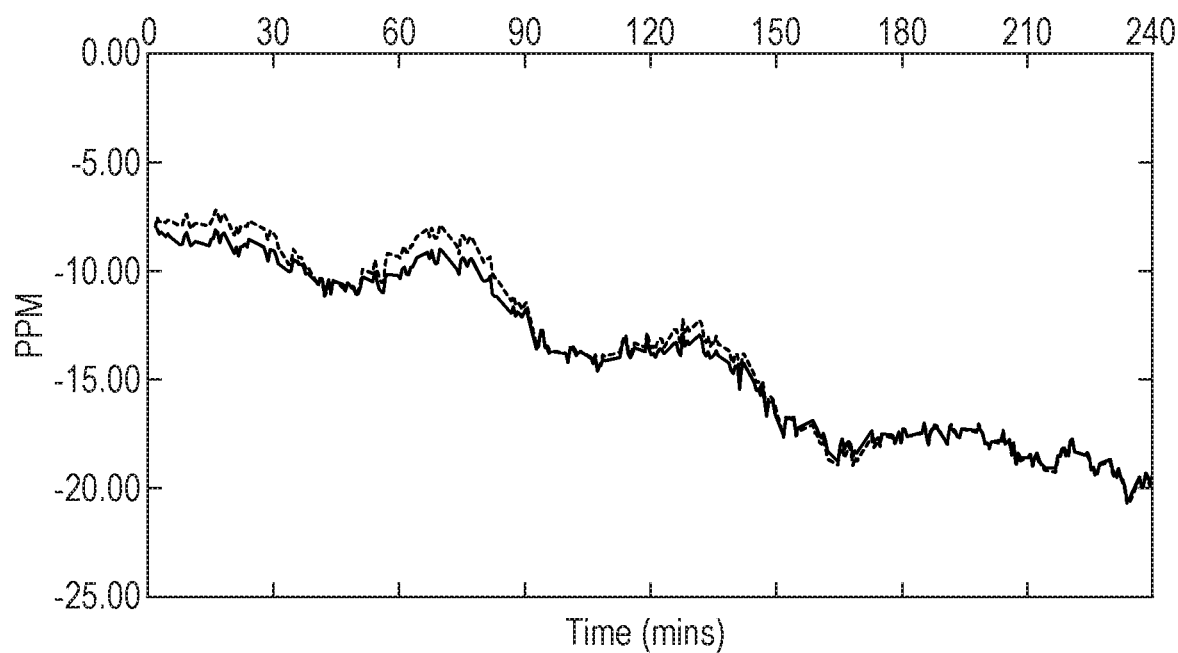
Figure 11:
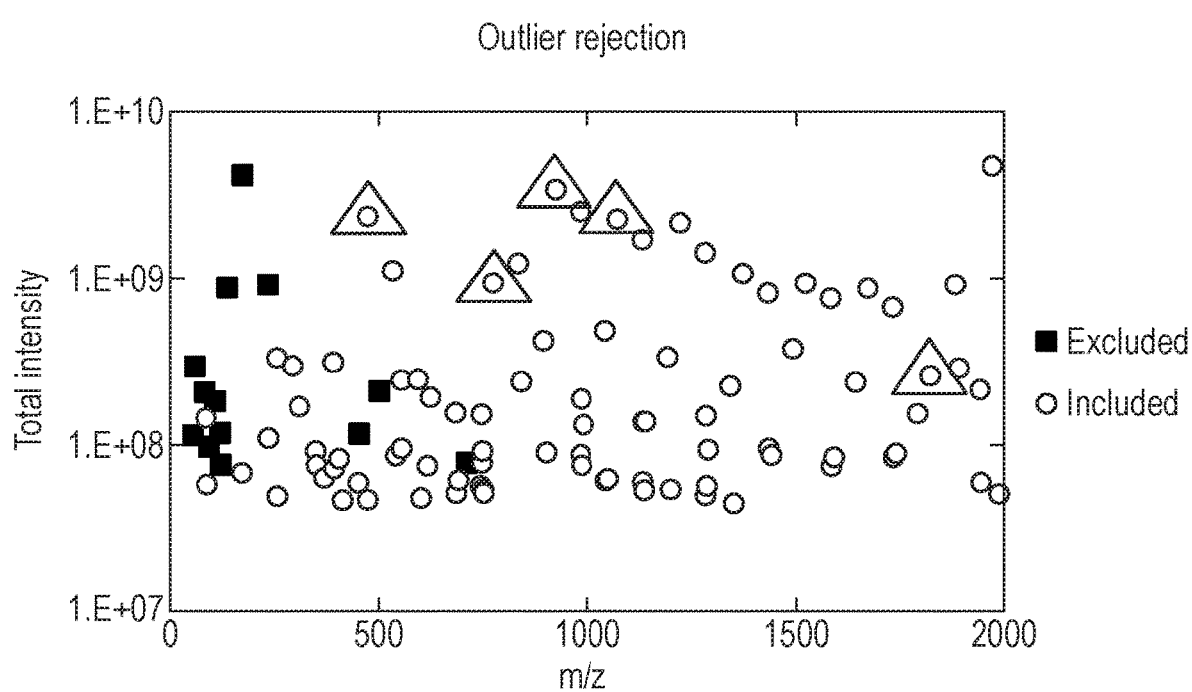

Using the same sodium iodide acquisition described above, we can process the data differently; instead of using six selected ions, "background" ions are tracked, and the hundred most intense species are kept. The program is then allowed to reject any outliers. The offset and gradient variations obtained are shown in FIG. 9 and FIG. 10. Thirteen of the 100 were rejected as outliers including the species at 172 Da (see FIG. 11).

FIG. 12 shows the residuals in picoseconds of the measured arrival times of the six selected masses when the offset and gradient has been fitted using those same six species at each time point. FIG. 13 shows the residuals when the offset and gradient at each time point is estimated using 100 tracked species with thirteen rejections.

It will be appreciated that the various embodiments described in detail above are potentially applicable to any type of mass analyser. However, various embodiments relate to time-of-flight mass spectrometry instruments, and especially to folded flight path instruments. In particular, the approach according to various embodiments may be implemented on a folded flight path instrument in order to address specific short term mass stability issues with folded flight path instruments.

The methods in accordance with the present technology may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), or any other suitable system.

The technology also extends to a computer software carrier comprising such software which when used to operate a graphics processor, renderer or microprocessor system comprising data processing means causes in conjunction with said data processing means said processor, renderer or system to carry out the steps of the methods of the present invention. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the invention need be carried out by computer software and thus from a further broad aspect the present technology provides computer software and such software installed on a computer software carrier for carrying out at least one of the steps of the methods set out herein.

The present technology may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Although the present invention has been described with reference to preferred embodiments, it will be understood by those skilled in the art that various changes in form and detail may be made without departing from the scope of the invention as set forth in the accompanying claims.

The invention claimed is:

1. A method of processing mass spectral data, the mass spectral data comprising a plurality of mass spectra obtained from a mass spectrometry instrument during a corresponding plurality of acquisition periods, the method comprising:
   making direct calibration measurements to determine a calibration shift of the mass spectrometry instrument at one or more calibration time(s) using calibrants which have known mass to charge ratio (m/z) values or previously measured mass to charge ratio (m/z) values;
   determining a set of one or more intrinsic ion species that are present across multiple acquisition periods by:
      tracking mass spectral peaks across different acquisition periods by checking when the variation in mass to charge ratio (m/z) for the mass spectral peaks from acquisition period to acquisition period is consistent with an expected mass to charge ratio (m/z) variation over time, wherein the expected mass to charge ratio (m/z) variation over time is based on an expected variation in calibration shift; and
      associating a number of mass spectral peaks from different acquisition periods with a single ion species when the variation in mass to charge ratio (m/z) for the mass spectral peaks from acquisition period to acquisition period is consistent with the expected mass to charge ratio (m/z) variation over time; and
   using the direct calibration measurements, the expected variation in calibration shift and the set of one or more intrinsic ion species to calculate the calibration shift of the mass spectrometry instrument at one or more time point(s) of interest other than the calibration time(s).

2. The method of claim 1, wherein the step of calculating the calibration shift of the mass spectrometry instrument at the time point(s) of interest is performed using Bayesian methods.

3. The method of claim 2, wherein the calibration shift is calculated by: determining a prior probability distribution for the calibration shifts based on the known calibration shift at the calibration time(s) and the expected variation in calibration shift; and determining an updated probability distribution for the calibration shifts and the mass to charge ratios for the intrinsic ion species based on the prior probability distribution and the measured intrinsic ion species.

4. The method of claim 3, comprising integrating the updated probability distribution over the calibration shift and mass to charge ratios for at a set of intrinsic ion species to determine a marginal likelihood associated with the updated probability distribution.

5. The method of claim 4, comprising evaluating the marginal likelihoods for a plurality of different sets/subsets of intrinsic ion species to determine which set/subsets of intrinsic ion species to use when determining the updated probability distribution for calculating the calibration shift at the time point(s) of interest.

6. The method of claim 1, wherein the calibration measurements are performed using external or extrinsic lock mass calibrants.

7. The method of claim 1, comprising determining a correction factor for correcting the mass spectral data based on the calculated calibration shift.

8. The method of claim 7, wherein the correction factor comprises a mass, mass to charge ratio or time correction factor.

9. The method of claim 1, wherein the expected mass to charge ratio variation over time is determined based on a predetermined function describing an expected variation in calibration shift for the instrument over time obtained from measurements performed using known calibrants in an environmental chamber during a pre-characterisation of the mass spectrometry instrument.

10. The method of claim 1, comprising generating a first mass spectral data set and correcting the mass, mass to charge ratio or time of at least a portion of the first mass spectral data set using the determined correction factor in order to generate a second corrected mass spectral data set.

11. A non-transitory computer readable storage medium storing software code that when executing on a data processor performs a method of processing mass spectral data, the mass spectral data comprising a plurality of mass spectra obtained from a mass spectrometry instrument during a corresponding plurality of acquisition periods, the method comprising:
  making direct calibration measurements to determine a calibration shift of the mass spectrometry instrument at one or more calibration time(s) using calibrants which have known mass to charge ratio (m/z) values or previously measured mass to charge ratio (m/z) values;
  determining a set of one or more intrinsic ion species that are present across multiple acquisition periods by:
    tracking mass spectral peaks across different acquisition periods by checking when the variation in mass to charge ratio (m/z) for the mass spectral peaks from acquisition period to acquisition period is consistent with an expected mass to charge ratio (m/z) variation over time, wherein the expected mass to charge ratio (m/z) variation over time is based on an expected variation in calibration shift; and
    associating a number of mass spectral peaks from different acquisition periods with a single ion species when the variation in mass to charge ratio (m/z) for the mass spectral peaks from acquisition period to acquisition period is consistent with the expected mass to charge ratio (m/z) variation over time; and
  using the direct calibration measurements, the expected variation in calibration shift and the set of one or more intrinsic ion species to calculate the calibration shift of the mass spectrometry instrument at one or more time point(s) of interest other than the calibration time(s).

12. A method of mass spectrometry comprising:
  obtaining mass spectral data from a mass spectrometry instrument during a plurality of acquisition periods, the mass spectral data comprising a plurality of mass spectra corresponding to the plurality of acquisition periods;
  processing the mass spectral data by:
    making direct calibration measurements to determine a calibration shift of the mass spectrometry instrument at one or more calibration time(s) using calibrants which have known mass to charge ratio (m/z) values or previously measured mass to charge ratio (m/z) values;
    determining a set of one or more intrinsic ion species that are present across multiple acquisition periods by:
      tracking mass spectral peaks across different acquisition periods by checking when the variation in mass to charge ratio (m/z) for the mass spectral peaks from acquisition period to acquisition period is consistent with an expected mass to charge ratio (m/z) variation over time, wherein the expected mass to charge ratio (m/z) variation over time is based on an expected variation in calibration shift; and
      associating a number of mass spectral peaks from different acquisition periods with a single ion species when the variation in mass to charge ratio (m/z) for the mass spectral peaks from acquisition period to acquisition period is consistent with the expected mass to charge ratio (m/z) variation over time; and
    using the direct calibration measurements, the expected variation in calibration shift and the set of one or more intrinsic ion species to calculate the calibration shift of the mass spectrometry instrument at one or more time point(s) of interest other than the calibration time(s); and
  correcting a first mass spectral data set obtained during the one or more time point(s) of interest using the calculated calibration shift.

* * * * *